United States Patent
Lai et al.

(10) Patent No.: US 10,040,939 B2
(45) Date of Patent: Aug. 7, 2018

(54) POLYIMIDE FILM HAVING A LOW DIELECTRIC CONSTANT AND A LOW GLOSS, AND METHOD OF FABRICATING THE SAME

(71) Applicant: TAIMIDE TECHNOLOGY INCORPORATION, Hsinchu County (TW)

(72) Inventors: Chun-Ting Lai, Hsinchu Hsien (TW); Chih-Wei Lin, Hsinchu Hsien (TW)

(73) Assignee: Taimide Technology Incorporation, Hsinchu County (TW)

( * ) Notice: Subject to any disclaimer, the term of this patent is extended or adjusted under 35 U.S.C. 154(b) by 263 days.

(21) Appl. No.: 14/697,185

(22) Filed: Apr. 27, 2015

(65) Prior Publication Data

US 2015/0307709 A1    Oct. 29, 2015

(30) Foreign Application Priority Data

Apr. 28, 2014    (TW) .............................. 103115180 A

(51) Int. Cl.
| | | |
|---|---|---|
| *C08L 79/08* | (2006.01) | |
| *C08J 5/18* | (2006.01) | |
| *C09D 179/08* | (2006.01) | |
| *C08G 73/10* | (2006.01) | |

(52) U.S. Cl.
CPC .......... *C08L 79/08* (2013.01); *C08G 73/1039* (2013.01); *C08G 73/1042* (2013.01); *C08G 73/1053* (2013.01); *C08G 73/1067* (2013.01); *C08G 73/1071* (2013.01); *C08J 5/18* (2013.01); *C09D 179/08* (2013.01); *C08J 2379/08* (2013.01); *C08J 2427/12* (2013.01); *C08J 2427/18* (2013.01)

(58) Field of Classification Search
CPC .......... C08K 3/04; C08L 79/08; C08L 27/12; C08L 27/18; C09D 179/08; C08G 73/1039; C08G 73/1042; C08G 73/1053; C08G 73/1067; C08G 73/1071; C08J 2379/08; C08J 2427/12; C08J 2427/18; C08J 5/18
USPC .................................................. 428/212, 220
See application file for complete search history.

(56) References Cited

U.S. PATENT DOCUMENTS

2003/0049056 A1*  3/2003  Finn .................... G03G 15/2057
                                                                    399/333
2006/0199069 A1*  9/2006  Kubota ............... H01M 4/8605
                                                                    429/483

FOREIGN PATENT DOCUMENTS

TW           200602301          1/2006

OTHER PUBLICATIONS

Office Action of Taiwan Patent Application No. 103115180 dated Mar. 24, 2015.

* cited by examiner

*Primary Examiner* — Jennifer Chriss
*Assistant Examiner* — Lawrence Ferguson
(74) *Attorney, Agent, or Firm* — Baker & McKenzie LLP

(57) ABSTRACT

A polyimide film includes a polyimide, a carbon black present in a quantity between about 0.5 wt % and about 5 wt %, and a fluorine-containing polymer present in a quantity between about 15 wt % and about 40 wt %. The polyimide film can be a single-layer film or a multi-layer film, and has a low dielectric constant and low gloss.

6 Claims, 1 Drawing Sheet

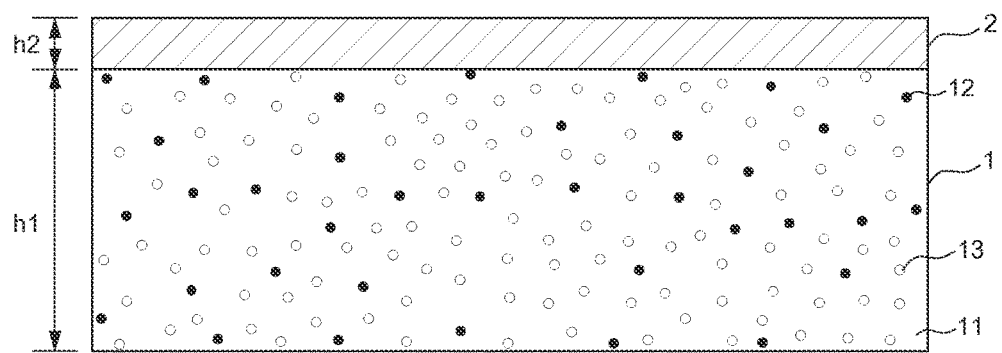

POLYIMIDE FILM HAVING A LOW DIELECTRIC CONSTANT AND A LOW GLOSS, AND METHOD OF FABRICATING THE SAME

CROSS-REFERENCE TO RELATED APPLICATION(S)

This application claims priority to Taiwan application no. 103115180 filed on Apr. 28, 2014, the entire contents of which are hereby incorporated in their entirety by reference.

BACKGROUND

1. Field of the Invention

The present invention relates to polyimide films, and more particularly to polyimide films having a low dielectric constant.

2. Description of the Related Art

Electronic products require increasingly thinner, smaller and lightweight printed circuit boards (PCB). Moreover, because wireless internet and communication devices operate at higher frequency, efforts have been made to develop circuit boards capable of high transmission rates. Basic requirements for the materials of the circuit boards include the ability to transfer data at a high rate, and prevent data alteration or interference during transmission.

It is known that the transmission speed in semiconductor devices is mainly limited by the occurrence of delay between metal wires carrying the signals. In order to reduce the delay in signal transmission, an insulating layer having a low dielectric constant is usually arranged between the wires, which can reduce capacitance coupling between the wires, enhance the operation speed and reduce noise interference. The insulating layer can block the flow of an electric current, and a lower dielectric constant can reduce the occurrence of undesirable stray capacitance. Moreover, the insulating material should have a dissipation factor that is as small as possible to minimize waste of electric energy.

Owing to its good thermal resistance, good chemical resistance, high mechanical strength, and high electrical resistance, polyimide has been widely used in electronics industry, for example, as material for making a printed circuit board. However, the dielectric constant and the dissipation factor of the conventional polyimide films may still be undesirably high for high-frequency applications. Furthermore, certain applications may require the use of a polyimide cover film having a low transmittance to cover and conceal the circuit design to prevent illegal copy. Usually, low gloss is also required for the polyimide cover film to provide better appearance.

Accordingly, there is a need for a polyimide film that can address the aforementioned issues and have desirable film characteristics.

SUMMARY

The present application describes polyimide films having a single-layer or multi-layer structure that can exhibit advantageous film characteristics and address the foregoing issues. In one embodiment, a base polyimide film includes a polyimide formed from condensation of diamine monomers and dianhydride monomers, a carbon black present in a quantity between about 0.5 wt % and about 5 wt % based on a total weight of the base polyimide film, and a fluorine-containing polymer present in a quantity between about 15 wt % and about 40 wt % based on the total weight of the base polyimide film, wherein the base polyimide film has a dielectric constant Dk less than about 3.05, and a gloss equal to or less than about 10.

In another embodiment, a multi-layer polyimide film is described, which includes a first and a second polyimide stacked on each other, the first polyimide layer being the aforementioned base polyimide film and having a thickness h1, the second polyimide layer having a thickness h2, and the ratio h2/h1 being equal to or less than about ⅕.

BRIEF DESCRIPTION OF THE DRAWINGS

FIG. 1 is a schematic view illustrating an embodiment of a multi-layer polyimide film.

DETAILED DESCRIPTION OF THE EMBODIMENTS

The present application describes a polyimide film including a polyimide, a carbon black and a fluorine-containing polymer. The polyimide film described herein has a desirable low dielectric constant ($D_k$), low gloss, low dissipation factor ($D_f$) and high shielding capacity.

Based on the total weight of the polyimide film, the quantity of carbon black present in the polyimide film can be between about 0.5 wt % and about 5 wt %, such as 0.5 wt %, 0.7 wt %, 0.9 wt %, 1 wt %, 1.5 wt %, 2 wt %, 2.5 wt %, 3 wt %, 3.5 wt %, 4 wt %, 4.5 wt %, 5 wt %, or any intermediate values between any of the aforementioned values. In one embodiment, the quantity of carbon black can be exemplary between about 0.5 and about 4.5 wt %, such as between about 0.5 wt % and about 3 wt %, and more preferably between about 1 wt % and about 3 wt %.

The polyimide film further includes a fluorine-containing polymer. The fluorine-containing polymer can be present in the polyimide film as independent molecules, and/or a portion or all of the functional groups of the fluorine-containing polymer may form chemical reactions (such as a covalent bonding) with the polyimide molecules in the polyimide film.

The fluorine-containing polymer can include, without limitation, fluorocarbons. More specifically, the fluorine-containing polymer can be fluorinated polyalkene, fluorine-substituted polyalkane, fluorine-substituted polyalkoxy, chlorofluorocarbons, and the like.

In some embodiments, the fluorine-containing polymer can be polytetrafluoroethylene (PTFE), polyfluorinated ethylene propylene (FEP), a polymer of polyfluorinated vinylidene (PVDF), a polymer of perfluoroalkoxy (PFA), a polymer of chlorotrifluoroethylene (CTFE), a polymer of ethylene chlorotrifuloroethylene (ECTFE), which can be used alone or in a combination thereof.

Based on the total weight of the polyimide film, the quantity of the fluorine-containing polymer present in the film can be between about 15 wt % and about 40 wt %, such as 16 wt %, 17 wt %, 20 wt %, 22 wt %, 25 wt %, 28 wt %, 30 wt %, 32 wt %, 35 wt %, 37 wt %, 38 wt %, 39 wt %, 40 wt %, or any intermediate values between any of the aforementioned values. In some embodiments, the quantity of the fluorine-containing polymer can be exemplary between about 20 wt % and about 40 wt %. In other embodiments, the quantity of the fluorine-containing polymer can be between about 15 wt % and about 30 wt %, more preferably from about 15 wt % to about 25 wt %.

The fluorine-containing polymer is present in the film in the form of powder, and has an average particle diameter between about 1 μm and about 10 μm, such as 1 μm, 2 μm, 2.5 µm, 3 µm, 4 µm, 5 µm, 6 µm, 7 µm, 7.5 µm, 8 µm, 9 µm, 10 µm, or any size between any of the aforementioned values. In some embodiments, the fluorine-containing polymer exemplary has an average particle diameter between about 1 µm and about 5 µm. In other embodiments, the fluorine-containing polymer may have an average particle diameter between about 6 µm and about 10 µm. In other variant embodiments, the fluorine-containing polymer may have an average particle diameter from about 2 µm to about 8 µm.

The polyimide film described herein can be a single-layer film or a multi-layer film, such as bilayer film or tri-layer film. In a multi-layer film embodiment, at least one layer contains carbon black and a fluorine-containing polymer as described previously, and the remaining layers can include similar or different additives. Moreover, the diamine monomers and dianhydride monomers in the respective polyimide layers can be similar or different.

FIG. 1 is a schematic view illustrating an embodiment of a multi-layer polyimide film including a first polyimide layer 1 and a second polyimide layer 2. The second polyimide layer 2 is arranged in contact with a surface of the first polyimide layer 1. The first polyimide layer 1 includes a polyimide 11 as base polymer forming a main molecular structure of the layer, and a carbon black 12 and a fluorine-containing polymer 13 distributed in the polyimide 11. The carbon black 12 and the fluorine-containing polymer 13 are present in the first polyimide layer 1 in the form of particles. Based on the total weight of the first polyimide layer 1, the quantity of the carbon black 12 can be between about 0.5 wt % and about 3 wt %, and the quantity of the fluorine-containing polymer can be between about 15 wt % and about 40 wt %. The second polyimide layer 2 at least includes a polyimide base polymer as main structure.

In the multi-layer polyimide film, the first polyimide layer 1 has a thickness h1, the second polyimide layer 2 has a thickness h2, and the thickness ratio h2/h1 is equal to or less than about 1/5. For example, the thickness ratio h2/h1 can be about 1/5, 1/6, 1/7, 1/8, 1/10, 1/12, 1/15, or any intermediate values between any of the aforementioned values.

The bilayer polyimide film shown in FIG. 1 can be prepared by the following method. First, diamine monomers and dianhydride monomers selected for forming the first polyimide layer 1 are incorporated in a solvent to form a first polyamic acid solution. The carbon black and the fluorine-containing polymer then can be incorporated and mixed in the first polyamic acid, and this mixture is then coated on a glass plate or a stainless steel plate to form a layer. The layer coated on the plate is then baked at a temperature between about 90° C. and about 350° C. so as to form the first polyimide layer 1.

The diamine monomers and the dianhydride monomers selected for forming the second polyimide layer 2 are incorporated in a solvent to form a second polyamic acid solution. The monomers used for forming the second polyimide layer 2 can be similar to or different from those of the first polyimide layer 1. The second polyamic acid solution is coated on the first polyimide layer 1, and then both the first polyimide layer 1 and the coated layer thereon are baked at a temperature between about 90° C. and about 350° C. to form a bilayer polyimide film.

The polyimide film described herein can be formed by thermal conversion or chemical conversion. When chemical conversion is used, a dehydrating agent and a catalyst can be further incorporated into the polyamic acid solution before coating. Examples of suitable solvents can include aprotic polar solvents, such as dimethylacetamide (DMAC), N,N'-dimethylformamide (DMF), N-methyl-2-pyrrolidone (NMP), dimethyl sulfoxide (DMSO), tetramethyl sulfoxide, N,N'-dimethyl-N,N'-trimethyleneurea (DMPU), and the like. Examples of suitable dehydrating agents can include aliphatic anhydride (such as acetic anhydride and propionic anhydride), aromatic anhydride (such as benzoic anhydride and phthalic anhydride), etc. Examples of suitable catalysts can include heterocyclic tertiary amine (such as picoline and pyridine), aliphatic tertiary amine (such as triethylamine (ETA)), aromatic tertiary amine (such as dimethylaniline), etc. The molar ratio of polyamic acid:dehydrating agent:catalyst can be about 1:2:1, i.e., for each mole of polyamic acid, about 2 moles of the dehydrating agent and about 1 mole of the catalyst are used.

In one embodiment, the polyimide film can be derived from condensation reaction of diamine monomers and dianhydride monomers, the diamine monomers and the dianhydride monomers being substantially equimolar.

Examples of suitable diamine monomers can include bis(trifluoromethyl)benzidine (TFMB), 4,4'-oxydianiline (4,4'-ODA), phenylenediamine (p-PDA), 1,3-bis(4-aminophenoxy)benzene (TPER), 1,4-bis(4-aminophenoxy)benzene (TPEQ), 2,2'-dimethyl[1,1'-biphenyl]-4,4'-diamine (m-TB-HG), 1,3'-bis(3-aminophenoxy)benzene (APBN), 3,5-diaminobenzotrifluoride (DABTF), 2,2'-bis[4-(4-aminophenoxyl)phenyl]propane (BAPP), 6-amino-2-(4-aminophenyl)benzoxazole (6PBOA), and 5-amino-2-(4-aminophenyl)benzoxazole (5PBOA), which can be used individually or in combination.

Examples of suitable dianhydride monomers can include 3,3',4,4'-biphenyltetracarboxylic dianhydride (BPDA), 2,2-bis[4-(3,4dicarboxyphenoxy) phenyl]propane dianhydride (BPADA), pyromellitic dianhydride (PMDA), 2,2'-bis-(3,4-dicarboxyphenyl) hexafluoropropane dianhydride (6FDA), 4,4-oxydiphthalic anhydride (ODPA), benzophenonetetracarboxylic dianhydride (BTDA), and 3,3',4,4'-dicyclohexyltetracarboxylic acid dianhydride (HBPDA), which can be used individually or in combination.

In a single-layer polyimide film embodiment, the diamine monomers can be TFMB, and the dianhydride monomers can be 3,3',4,4'-biphenyltetracarboxylic dianhydride (BPDA), 2,2-bis[4-(3,4dicarboxyphenoxy) phenyl]propane dianhydride (BPADA), or a combination thereof.

In a multi-layer polyimide film embodiment, the diamine monomers used for forming the first layer can be bis(trifluoromethyl)benzidine (TFMB), and the dianhydride monomera used for forming the first layer can be 3,3',4,4'-biphenyltetracarboxylic dianhydride (BPDA), 2,2-bis[4-(3, 4dicarboxyphenoxy) phenyl]propane dianhydride (BPADA), or a combination thereof. The diamine monomers and the dianhydride monomers used for forming of the second layer can be similar to those of the first layer. Alternatively, the second layer may be derived from 4,4'-oxydianiline (4,4'-ODA) as diamine monomers, and pyromellitic dianhydride (PMDA) as dianhydride monomers.

The polyimide films described herein have at least one of the following characteristics: a dielectric constant $D_k$ less than about 3.05, a dissipation factor $D_f$ less than about 0.0115, a gloss equal to or less than about 10, and a light transmittance less than about 30%.

As not limiting examples, the dielectric constant $D_k$ can be less than about 3.05, such as 3.04, 3.0, 2.8, 2.5, 2.0, 1.5, 1.2, or any intermediate values between any of the aforementioned values. The dissipation factor $D_f$ can be less than about 0.0115, such as 0.011, 0.010, 0.008, 0.005, 0.002, 0.001, or any intermediate values between any of the aforementioned values. The gloss can be less than 10, such as 9.9, 9.5, 9, 8, 7, 6, 5, 3, 1, 0.1, or any intermediate values between any of the aforementioned values. The light transmittance can be less than 30%, such as 29%, 25%, 20%, 15%, 10%, 5%, 1%, 0.5%, 0.1%, or any intermediate values between any of the aforementioned values.

In one embodiment, a single-layer polyimide film can more particularly have a dielectric constant $D_k$ less than about 3.05, a dissipation factor $D_f$ less than about 0.0115, a gloss less than about 10, and a light transmittance less than about 30%.

In another embodiment, a single-layer polyimide film has at least one of the following characteristics: a dielectric constant $D_k$ equal to or less than about 2.99, a dissipation factor $D_f$ equal to or less than about 0.011, gloss equal to or less than about 9.6, and light transmittance less than about 30%.

In yet another embodiment, a provided single-layer polyimide film can have a dielectric constant $D_k$ less than about 3.05, a dissipation factor $D_f$ less than about 0.0115, gloss equal to or less than about 10, and light transmittance less than about 30%.

Examples of fabricating polyimide films are further described in detail hereinafter.

EXAMPLES

Example 1

About 69.11 g of TFMB and about 412.5 g of DMAc are placed into a three-necked flask. The mixture is stirred at a temperature of about 30° C. until the TFMB is fully dissolved, and then about 56.83 g of BPDA and about 11.23 g of BPADA are added (TFMB, BPDA and BPADA are in a quantity of 25 wt % based on total weight of the monomers). Then the mixture is stirred at a temperature of about 25° C. for 20 hours so as to obtain a first polyamic acid solution, which has a rotational viscosity of 140,000 cps at a temperature of 25° C. About 24.2 g of PTFE powder (in a quantity of 15 wt % based on the total weight of the monomers) and 4.24 g of carbon black (model No.: SB4A, purchased from ORION) (in a quantity of 3 wt % based on the total weight of the monomers) are added into the first polyamic acid solution, which is then stirred to obtain a uniform mixture. Then acetic anhydride and picoline are added as catalysts (the molar ratio of the polyamic acid solution:acetic anhydride:picoline is 1:2:1). The mixture is coated on a glass plate after being de-bubbled, and then the glass plate with the coated mixture is heated in an oven at a temperature of about 80° C. for 30 minutes to remove most of the solvent. Then the glass plate coated with the polyamic acid solution is heated in an oven at a temperature between 170° C. and 260° C. for 4 hours so as to dry the polyamic acid solution and form a film. The obtained polyimide film had a thickness equal to 12 μm.

Example 2

A single-layer polyimide film is prepared like in Example 1, except that 45.72 g of PTFE (i.e., in a quantity of 25 wt % based on the total weight of the monomers) is used.

Example 3

A single-layer polyimide film is prepared like in Example 1, except that 91.45 g of PTFE (i.e., in a quantity of 40 wt % based on the total weight of the monomers) is used.

Example 4

A single-layer polyimide film is prepared like in Example 2, except that 0.69 g of carbon black (i.e., in a quantity of 0.5 wt % based on the total weight of the monomers) is used.

Example 5

A single-layer polyimide film is prepared like in Example 2, except that 7.22 g of carbon black (i.e., in a quantity of 5 wt % based on the total weight of the monomers) is used.

Example 6

A single-layer polyimide film is prepared like in Example 1, except that 7.22 g of carbon black (i.e., in a quantity of 5 wt % based on the total weight of the monomers) is used.

Example 7

A single-layer polyimide film is prepared like in Example 1, except that 0.69 g of carbon black (i.e., in a quantity of 0.5 wt % based on the total weight of the monomers) is used.

Example 8

A single-layer polyimide film is prepared like in Example 3, except that 0.69 g of carbon black (i.e., in a quantity of 0.5 wt % based on the total weight of the monomers) is used.

Example 9

Preparation of a Bilayer Polyimide Film

A first polyimide layer prepared like in Example 6 is fixed on a glass plate. A second polyimide layer then can be prepared like in Example 1. After being de-bubbled, the second polyamic acid solution is coated on the first polyimide layer and then baked, wherein about 37.15 g of ODA, about 12.14 g of PDA and about 88.21 g of PMDA are used for the second polyamic acid solution, the monomers are in a quantity of 25 wt % based on the total weight of the reaction solution, and no PTFE powder and no carbon black are added. The obtained bilayer polyimide film has a total thickness equal to about 14.4 μm, the thickness of the first layer being about 12 μm, and the thickness of the second layer being about 2.4 μm.

Comparative Example 1

A single-layer polyimide film is prepared like in Example 4, except that no PTFE is incorporated.

Comparative Example 2

A single-layer polyimide film is prepared like in Example 3, except that no carbon black is added.

Comparative Example 3

A single-layer polyimide film is prepared like in Example 4, except that PTFE is incorporated in a quantity of about 10 wt %.

Comparative Example 4

A single-layer polyimide film is prepared like in Example 4, except that PTFE is added in a quantity of about 45 wt %.

Comparative Example 5

A single-layer polyimide film is prepared like in Example 1, except that carbon black is incorporated in a quantity of about 7 wt %.

Comparative Example 6

Preparation of a Bilayer Polyimide Film

A bilayer polyimide film is prepared like in Example 9. The obtained bilayer polyimide film has a total thickness equal to about 15 μm, the thickness of the first layer being about 12 μm, and the thickness of the second layer being about 3 μm.

The films obtained from the above Examples and Comparative Examples are tested to evaluate certain film characteristics including a dielectric constant $D_k$, a dissipation factor $D_f$, a gloss GU and a transmittance TT. Exemplary test results of these characteristics are shown in Table 1 and Table 2.

Dielectric Constant $D_k$ and Dissipation Factor $D_f$:

A sample to be tested is immersed in deionized water for about 10 minutes, then placed in an oven to be baked and dried at a temperature of about 110° C. for about 30 minutes. The ratio $D_k/D_f$ of the sample is measured by a precision impedance analyzer (Model No.: Agilent 4294A).

Gloss GU:

The gloss of a sample at an angle of 60 degrees is measured by using a handheld gloss meter (Model No.: Micro Tri Gloss—BYK Gardner).

Transmittance TT (%):

The transmittance of a sample is measured by using a haze meter (Model No.: Nippon Denshoku NDH 2000 Haze Meter).

TABLE 2

Test results for bilayer polyimide films

| | First polyimide layer | | Thickness ratio (h2/h1) | $D_k$ | $D_f$ | TT (%) | GU |
|---|---|---|---|---|---|---|---|
| | PTFE (wt %) | Carbon black (wt %) | | | | | |
| Example 9 | 15 | 5 | 1/5 | 3.02 | 0.0113 | 0.12 | 8.4 |
| Comparative Example 6 | 15 | 5 | 1/4 | 3.17 | 0.0138 | 0.12 | 8.4 |

It is found that the addition of a suitable amount of fluorine-containing polymer such as PTFE (15-40 wt %) can reduce the dielectric constant, the dissipation factor, and the gloss at an angle of 60 degrees, and the addition of a suitable amount of carbon black (0.5-5 wt %) can further provide a sufficiently low light transmittance.

As shown in Table 1, compared to Example 4, a same quantity of carbon black (0.5 wt %) is incorporated in the films prepared in Comparative Examples 1 and 3, but when the quantity of PTFE is too small, the values of $D_k$ and $D_f$, the transmittance and the gloss of the polyimide films are excessively high, which cannot meet desirable film characteristics.

Compared to Examples 3 and 8, a same quantity of PTFE is incorporated in the film prepared in Comparative Example 2, but there is no addition of carbon black. It is observed that the film derived from Comparative Example 2 cannot exhibit desirably low light transmittance (less than 30%).

Furthermore, the test results for films prepared according to Comparative Examples 4 and 5 show that when an excessive amount of one of PTFE and carbon black is added, no effective film can be formed. More specifically, the polyimide films prepared according to Comparative Examples 4 and 5 are too brittle and crack during peeling from the glass plate.

TABLE 1

Test results for single-layer polyimide films

| | Content of PTFE (wt %) | Content of carbon black (wt %) | $D_k$ | $D_f$ | TT (%) | GU | Film forming ability |
|---|---|---|---|---|---|---|---|
| Example 1 | 15 | 3 | 2.93 | 0.0093 | 0.15 | 9.6 | good |
| Example 2 | 25 | 3 | 2.78 | 0.0085 | 0.09 | 6.5 | good |
| Example 3 | 40 | 3 | 2.64 | 0.0078 | 0.04 | 3.5 | good |
| Example 4 | 25 | 0.5 | 2.71 | 0.0079 | 12.04 | 7.2 | good |
| Example 5 | 25 | 5 | 2.95 | 0.0094 | 0.08 | 6.4 | good |
| Example 6 | 15 | 5 | 2.98 | 0.0108 | 0.12 | 8.4 | good |
| Example 7 | 15 | 0.5 | 2.86 | 0.0087 | 28.81 | 9.3 | good |
| Example 8 | 40 | 0.5 | 2.61 | 0.0075 | 21.73 | 3.1 | good |
| Comparative Example 1 | 0 | 0.5 | 3.14 | 0.0132 | 58.85 | 86.1 | good |
| Comparative Example 2 | 40 | 0 | 2.59 | 0.0071 | 46.44 | 5.3 | good |
| Comparative Example 3 | 10 | 0.5 | 3.08 | 0.0120 | 39.12 | 19.1 | good |
| Comparative Example 4 | 45 | 0.5 | — | — | — | — | No film is formed due to crack formation during peeling. |
| Comparative Example 5 | 15 | 7 | — | — | — | — | No film is formed due to crack formation during peeling. |

Furthermore, with respect to a polyimide film having a multi-layer structure, the test results of Example 9 show that a multi-layer polyimide film with a specific thickness ratio exhibit desirable characteristics. In contrast, the test results of Comparative Example 6 show that when the ratio h2/h1 is higher, the dielectric constant $D_k$ and the dissipation factor $D_f$ of the film are significantly increased, which makes the film unsuitable for certain applications (such as high-frequency applications).

Accordingly, by using a combination of certain monomers and specific content of carbon black and fluorine-containing polymer, the polyimide films described herein can exhibit advantages characteristics including a low dielectric constant $D_k$, a low gloss, a low dissipation factor $D_f$ and a high shielding capacity. For a multi-layer polyimide film, it is further found that advantageous film characteristics can be provided for a specific range of a thickness ratio between the layers.

The foregoing realizations have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope as defined in the claims that follow.

What is claimed is:

1. A base polyimide film comprising:
   a polyimide derived from condensation reaction of diamine monomers and dianhydride monomers;
   a carbon black present in a quantity between about 0.5 wt % and about 5 wt % based on a total weight of the base polyimide film; and
   a fluorine-containing polymer present in a quantity between about 15 wt % and about 40 wt % based on the total weight of the base polyimide film, wherein the fluorine-containing polymer has an average particle diameter between about 1 µm and about 10 µm;
   wherein the base polyimide film has a dielectric constant $D_k$ less than about 3.05, and a gloss equal to or less than about 10.

2. The base polyimide film according to claim 1, wherein the fluorine-containing polymer is selected from a group consisting of polytetrafluoroethylene (PTFE), polyfluorinated ethylene propylene (FEP), a polymer of polyfluorinated vinylidene (PVDF), a polymer of perfluoroalkoxy (PFA), a polymer of chlorotrifluoroethylene (CTFE), a polymer of ethylene chlorotrifuloroethylene (ECTFE).

3. The base polyimide film according to claim 1, wherein the diamine monomers are selected from a group consisting of bis(trifluoromethyl)benzidine (TFMB), 4,4'-oxydianiline (4,4'-ODA), phenylenediamine (p-PDA), 1,3-bis(4-aminophenoxy)benzene (TPER), 1,4-bis(4-aminophenoxy)benzene (TPEQ), 2,2'-dimethyl[1,1'-biphenyl]-4,4'-diamine (m-TB-HG), 1,3'-bis(3-aminophenoxy)benzene (APBN), 3,5-diaminobenzotrifluoride (DABTF), 2,2'-bis[4-(4-aminophenoxy)phenyl]propane (BAPP), 6-amino-2-(4-aminophenyl)benzoxazole (6PBOA), and 5-amino-2-(4-aminophenyl)benzoxazole (5PBOA).

4. The base polyimide film according to claim 1, wherein the dianhydride monomers are selected from a group consisting of 3,3',4,4'-biphenyltetracarboxylic dianhydride (BPDA), 2,2-bis [4-(3,4dicarboxyphenoxy) phenyl] propane dianhydride (BPADA), pyromellitic dianhydride (PMDA), 2,2'-bis-(3,4-dicarboxyphenyl) hexafluoropropane dianhydride (6FDA), 4,4-oxydiphthalic anhydride (ODPA), benzophenonetetracarboxylic dianhydride (BTDA), and 3,3',4,4'-dicyclohexyltetracarboxylic acid dianhydride (HBPDA).

5. The base polyimide film according to claim 1, having a dissipation factor $D_f$ less than about 0.0115.

6. The base polyimide film according to claim 1, having a light transmittance less than about 30%.

\* \* \* \* \*